United States Patent
Tai et al.

(10) Patent No.: US 8,836,316 B2
(45) Date of Patent: Sep. 16, 2014

(54) SELECTABLE PHASE POWER SUPPLY SYSTEM

(75) Inventors: Fang-Ta Tai, New Taipei (TW);
Chen-Hsiang Lin, New Taipei (TW);
Jen-Fan Sun, New Taipei (TW);
Cheng-I Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 412 days.

(21) Appl. No.: 13/325,009

(22) Filed: Dec. 13, 2011

(65) Prior Publication Data

US 2013/0076334 A1 Mar. 28, 2013

(51) Int. Cl.
*H02M 3/157* (2006.01)
*H02M 3/158* (2006.01)
*G06F 1/26* (2006.01)
*H02M 3/156* (2006.01)

(52) U.S. Cl.
CPC .... *H02M 3/1584* (2013.01); *H02M 2003/1566* (2013.01); *H02M 2003/1586* (2013.01)
USPC ............ 323/351; 713/300; 713/340; 323/283

(58) Field of Classification Search
CPC ....... H02M 3/00; H02M 3/156; H02M 3/157; H02M 3/158; H02M 2001/0012; H02M 2003/158; G06F 1/26
USPC .................... 323/283, 351; 713/300, 310, 340
See application file for complete search history.

(56) References Cited

U.S. PATENT DOCUMENTS

| | | | |
|---|---|---|---|
| 6,836,848 B2 * | 12/2004 | Yu et al. | 713/300 |
| 7,594,130 B1 * | 9/2009 | Hu | 713/300 |
| 2009/0199021 A1 * | 8/2009 | Chu et al. | 713/300 |
| 2011/0099309 A1 * | 4/2011 | Hu | 713/300 |

FOREIGN PATENT DOCUMENTS

| | | |
|---|---|---|
| TW | 200832124 A | 8/2008 |
| TW | 201031092 A | 8/2010 |
| TW | 201124830 A | 7/2011 |

* cited by examiner

*Primary Examiner* — Gary L Laxton
(74) *Attorney, Agent, or Firm* — Novak Druce Connolly Bove + Quigg LLP

(57) ABSTRACT

A power supply system to provide power for a central processing unit (CPU) includes a bridge circuit, a pulse width modulation (PWM) controller and a pulse adjusting driver circuit. The bridge circuit detects a work state of the PWM controller to obtain a feedback signal output from the PWM controller, and provides the feedback signal to the CPU. The CPU outputs a control signal to the bridge circuit according to a work state of the CPU and the feedback signal, and the bridge circuit outputs a PWM signal to the pulse adjusting driver circuit according to the control signal. The pulse adjusting driver circuit receives a first driving signal provided by an external circuit, and adjusts the first driving signal according to the PWM signal to generate at least one second driving signal to drive the CPU.

20 Claims, 2 Drawing Sheets

SELECTABLE PHASE POWER SUPPLY SYSTEM

BACKGROUND

1. Technical Field

The present disclosure generally relates to power supply systems, and particularly to a power supply system that can selectively deliver signals in one or more than phase.

2. Description of Related Art

Power supply requirements for central processing units (CPUs) used in different electrical devices usually differ even among devices developed by the same company. For example, computers using voltage regulator modules (VRMs) developed by INTEL Corporation have certain power supply requirements that are different from the power supply requirements of computers using INTEL mobile voltage positioning (IMVP) technology.

Therefore, too many power supply designs are needed to meet the needs of the industry.

What is needed, therefore, is a power supply system which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will be made to the drawings to describe the embodiments in detail.

Figure 1:
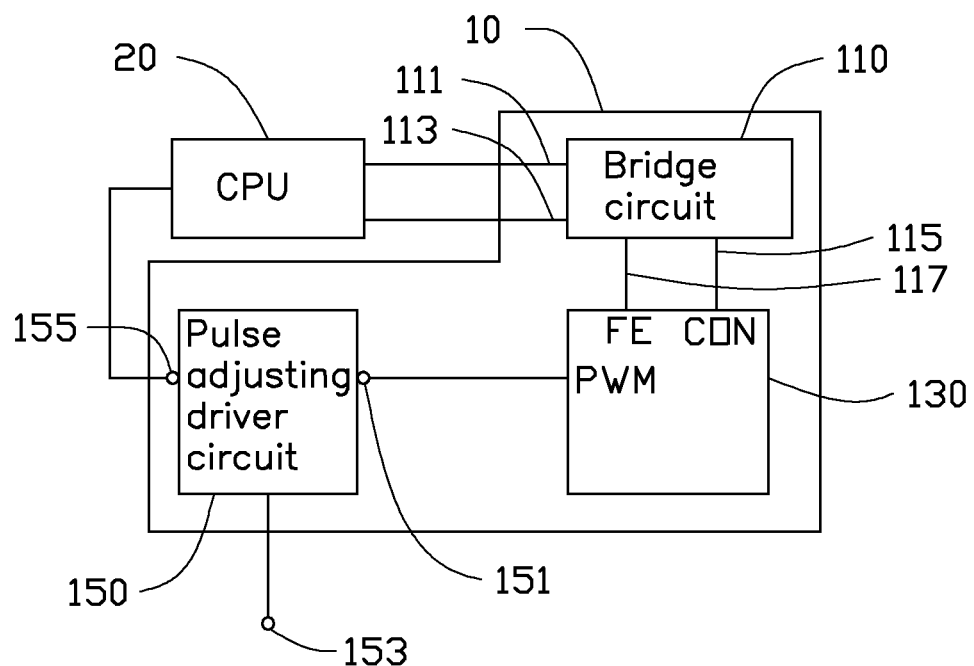
FIG. 1 is a schematic block diagram of a power supply system according to an embodiment, the power supply system including a pulse adjusting driver circuit.

FIG. 1 is a schematic block diagram of a power supply system 10 according to an embodiment, the power supply system 10 including a pulse adjusting driver circuit 150. In this embodiment, the power supply system 10 is configured to provide power to a CPU 20, and includes a bridge circuit 110, a pulse width modulation (PWM) controller 130, and the pulse adjusting driver circuit 150. In other embodiments, the system 10 may be used to provide power to other kinds of components or devices.

In one embodiment, the bridge circuit 110 can be an integrated circuit, and includes four pins 111, 113, 115, 117. The two pins 111, 113 are connected to the CPU 20, the pin 111 is configured to receive a control signal output from the CPU 20, and the pin 113 is configured to provide a feedback signal to the CPU 20. The other two pins 115, 117 are connected to the PWM controller 130.

The PWM controller 130 is a unidirectional PWM controller, and includes a control signal input terminal "CON", a feedback signal output terminal "FE", and a PWM signal output terminal "PWM". The control signal input terminal "CON" and the feedback signal output terminal "FE" are respectively connected to the two pins 115, 117 of the bridge circuit 110, and the PWM signal output terminal "PWM" is connected to the pulse adjusting driver circuit 150.

The bridge circuit 110 is configured to detect a work state of the PWM controller 130, receive the feedback signal output from the feedback signal output terminal "FE" of the PWM controller 130 via the pin 117, and provide the feedback signal to the CPU 20 via the pin 113. The CPU 20 is configured to output a control signal according to a work state thereof and the feedback signal. The work state of the CPU 20 may be a power type requirement thereof. The bridge circuit 110 is further configured to receive the control signal via the pin 111, and provide the control signal to the control signal input terminal "CON" of the PWM controller 130 via the pin 115. The PWM controller 130 is configured to generate a PWM signal according to the control signal, and output the PWM signal to the pulse adjusting driver circuit 150 via the PWM signal output terminal "PWM".

The pulse adjusting driver circuit 150 includes a signal receiving terminal 151, a driving signal input terminal 153, and a voltage output terminal 155. The signal receiving terminal 151 is connected to the PWM signal output terminal "PWM" of the PWM controller 130 to receive the PWM signal, the driving signal input terminal 153 is configured to receive a first driving signal provided by an external circuit, and the voltage output terminal 155 is connected to the CPU 20. The pulse adjusting driver circuit 150 is configured to adjust a phase of the first driving signal according to the PWM signal, generate a second driving signal, and output the second driving signal to the CPU 20 for driving the CPU 20.

Figure 2:
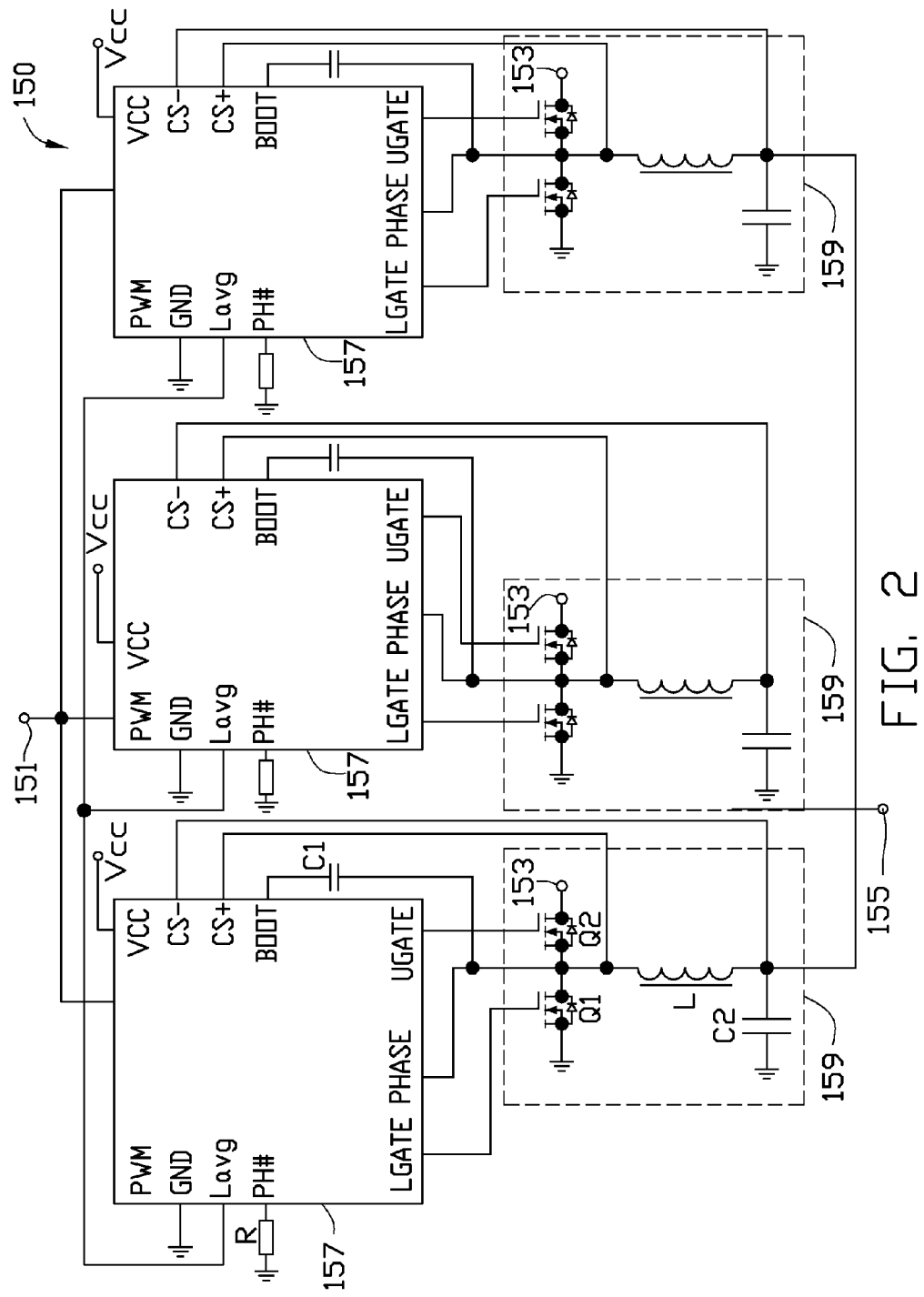
FIG. 2 is a schematic circuit diagram of the pulse adjusting driver circuit of FIG. 1 according to one embodiment.

FIG. 2 is a schematic circuit diagram of the pulse adjusting driver circuit 150 of FIG. 1 according to one embodiment. The pulse adjusting driver circuit 150 includes a plurality of pulse adjusting drivers 157 and a plurality of pulse adjusting switch circuits 159 corresponding to the adjusting drivers 157. In this embodiment, three adjusting drivers 157 and three switch circuits 159 are taken for example. In an alternative embodiment, the numbers of the adjusting drivers 157 and the switch circuits 159 can be increased or decreased to meet an actual requirement of the CPU 20 according to different power supply standards.

Each adjusting driver 157 includes a PWM signal pin "PWM" connected to the signal receiving terminal 151, two detection pins "CS−", "CS+", an average current pin "Lavg", a power pin "VCC", a ground "GND", a phase pin "PHASE", a phase adjusting pin "PH#", a bootstrap pin "BOOT", a low pass pin "LGATE", and a high pass pin "UGATE". Each pulse adjusting driver 157 further includes an average current controller (not shown) and a phase controller (not shown) therein. The power pin "VCC" is connected to an external power source, and the ground "GND" is grounded.

In this embodiment, a first capacitor C1 is connected between the bootstrap pin "BOOT" and the phase pin "PHASE" to pull up a voltage of the phase pin "PHASE". In an alternative embodiment, the second capacitor C2 can be omitted. In this embodiment, the phase adjusting pin "PH#" is grounded via a phase adjusting resistor R, and the phase controller can automatically adjust a phase of the PWM signal received by the pulse adjusting driver circuit 150 by adjusting a resistance of the phase adjusting resistor R. The adjusted PWM signal is output to the corresponding switch circuit 159 via the phase pin "PHASE" to adjust the phase of the first driving signal.

Each switch circuit 159 includes a first transistor Q1, a second transistor Q2, an inductor L, a second capacitor C2. Each of the first transistor Q1 and the second transistor Q2 includes a control terminal (not labeled), a first conducting terminal (not labeled), and a second conducting terminal (not labeled).

The phase pin "PHASE" of the corresponding adjusting driver 157 is connected to the voltage output terminal 155 via the inductor L. The two detection pins "CS−", "CS+" of the corresponding adjusting driver 157 are connected to two terminals of the inductor L to detect an inducting current flowing through the inductor L. The average current controller of the corresponding adjusting driver 157 outputs an average current signal via the average current pin "Lavg" according to the inducting current. The average current pins "Lavg" of all the adjusting drivers 157 are connected to one another to make average current signals output from the adjusting drivers 157 be equal.

The control terminal of the first transistor Q1 is connected to the low pass pin "LGATE" of the corresponding adjusting driver 157. The first conducting terminal of the first transistor Q1 is connected to the phase pin "PHASE" of the corresponding adjusting driver 157 and the second conducting terminal of the second transistor Q2. The second conducting terminal of the first transistor Q1 is grounded. The control terminal of the second transistor Q2 is connected to the high pass pin "UGATE" of the corresponding adjusting driver 157. The first conducting terminal of the second transistor Q2 is connected to the driving signal input terminal 153. In this embodiment, the first and second transistors Q1, Q2 are field effect transistors, and the control terminal, the first conducting terminal and the second conducting terminal of each of the first and second transistors Q1, Q2 respectively correspond to a gate electrode, a drain electrode, and a source electrode of the field effect transistor.

The second capacitor C2 is connected between the voltage output terminal 155 and ground to filter the second driving signal.

In this embodiment, the adjusting driver 157 adjusts the phase of the PWM signal by adjusting a resistance of the phase adjusting resistor R. In other embodiments, the phase controller of the adjusting drivers 157 can be designed to realize a phase adjusting function by adjusting parameters of other components, such as capacitances of capacitors or inductances of inductors, and not limited to the resistance of the phase adjusting resistor R.

In operation, the signal receiving terminal 151 receives the PWM signal output from the PWM controller 130. Each adjusting driver 157 adjusts the phase of the PWM signal by adjusting the resistance of the respective phase adjusting resistor R to make the adjusted PWM signals provided by all the adjusting drivers 157 have different phases. Each adjusting driver 157 outputs a low pass driving signal and a high pass driving signal respectively via the low pass pin "LGATE" and the high pass pin "UGATE" to turn on/off the first and second transistors Q1, Q2 of the corresponding switch circuit 159 by time-sharing control. That is, each adjusting driver 157 respectively outputs the low pass driving signal and the high pass driving signal during different times, thus the first and second transistors Q1, Q2 of each corresponding switch circuit 159 can be turned on/off without during the same time. Under the condition that the first transistor Q1 is turned off and the second transistor Q2 is turned on, the first driving signal received by the driving signal input terminal 153 and the adjusted PWM signal output from the phase pin "PHASE" are provided to the inductor L, and transformed into the second driving signal output from the voltage output terminal 155 via the inductor L.

Due to the phase of the second driving signal from each adjusting driver 157 different from one another, the pulse adjusting driver circuit 150 can provide driving signals having different phases to the CPU 20 in time-sharing or during different times to achieve a multiphase output function. Therefore, the CPU 20 can work with multiphase driving signal.

In an alternative embodiment, if the CPU 20 merely needs a single phase driving signal, the pulse adjusting driver circuit 150 can merely include one pulse adjusting driver 157 and one corresponding pulse adjusting switch circuit 159 to provide the driving signal to the CPU 20.

Therefore, even the power supply standards change, the power supply system 10 can change the number of the pulse adjusting driver 157 and the pulse adjusting switch circuit 159 or adjust the outputs of the pulse adjusting drivers 157 to meet the different power supply standards. Thus, the power supply system 10 can provide power to the CPUs of different network devices, such as desktop computers, notebooks, workstations, servers, and the like.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A power supply system to provide power for a central processing unit (CPU), comprising:
   a bridge circuit;
   a pulse width modulation (PWM) controller; and
   a pulse adjusting driver circuit;
   wherein the bridge circuit detects a work state of the PWM controller to obtain a feedback signal output from the PWM controller, and provides the feedback signal to the CPU, the CPU outputs a control signal to the bridge circuit according to a work state of the CPU and the feedback signal, the bridge circuit outputs a PWM signal to the pulse adjusting driver circuit according to the control signal, and the pulse adjusting driver circuit receives a first driving signal provided by an external circuit, and adjusts the first driving signal according to the PWM signal to generate at least one second driving signal to drive the CPU.

2. The power supply system of claim 1, wherein the pulse adjusting driver circuit comprises a plurality of pulse adjusting drivers and a plurality of pulse adjusting switch circuits, each pulse adjusting driver corresponds to one pulse adjusting switch circuit, and each group of the pulse adjusting driver and the pulse adjusting switch circuit is configured to provide one second driving signal having different phases from one another to the CPU.

3. The power supply system of claim 2, wherein the second driving signal output from each group of the pulse adjusting driver and the pulse adjusting switch circuit is provided to the CPU in time-sharing.

4. The power supply system of claim 2, wherein each pulse adjusting driver receives the PWM signal, adjusts a phase of the PWM signal, and output a low pass driving signal, a high pass driving signal and the adjusted PWM signal to the corresponding pulse adjusting switch circuit, and the corresponding pulse adjusting switch circuit adjusts the first driving signal according to the low pass driving signal, the high pass driving signal and the adjusted PWM signal to generate the second driving signal.

5. The power supply system of claim 4, wherein the phases of the PWM signals adjusted by each pulse adjusting driver are different from one another.

6. The power supply system of claim 5, wherein each pulse adjusting driver comprises a phase adjusting pin grounded via a phase adjusting resistor, the pulse adjusting driver adjusting the phase of the PWM signal by adjusting a resistance of the phase adjusting resistor.

7. The power supply system of claim 4, wherein the corresponding pulse adjusting switch circuit comprises a first and second transistors, and an inductor, the low pass driving signal and the high pass driving signal respectively control the first and second transistors to turn on/off, in the situation that the first transistor is turned off and the second transistor is turned on, the first driving signal is provided to an terminal of the inductor via the second transistor and the adjusted PWM signal is directly provided to the same terminal of the inductor to generate the second driving signal, and the second driving signal is output from the other terminal of the inductor.

8. The power supply system of claim 7, wherein the corresponding pulse adjusting switch circuit further comprises a capacitor connected between the other terminal of the inductor and ground.

9. The power supply system of claim 7, wherein each pulse adjusting driver comprises two detection pins connected to the two terminals of the inductors to detect current flowing through the inductor.

10. The power supply system of claim 9, wherein each pulse adjusting driver further comprises an average current pin and an average current controller, the average current pin of the pulse adjusting driver is connected to those of other pulse adjusting drivers, and the average current controller outputs an average current signal via the average current pin according to the inducting current.

11. A power supply system to provide power for a processor, comprising:
   a bridge circuit;
   a pulse width modulation (PWM) controller; and
   a pulse adjusting driver circuit;
   wherein the bridge circuit detects a work state of the PWM controller to obtain a feedback signal output from the PWM controller, and provides the feedback signal to the processor, the processor outputs a control signal to the bridge circuit according to a work state thereof and the feedback signal, the bridge circuit outputs a PWM signal to the pulse adjusting driver circuit according to the control signal, and the pulse adjusting driver circuit receives a first driving signal provided by an external circuit, adjusts the PWM signal, and adjusts the first driving signal according to the adjusted PWM signal to generate at least one second driving signal having different phase to drive the processor.

12. The power supply system of claim 11, wherein the pulse adjusting driver circuit comprises at least one pulse adjusting driver and at least one pulse adjusting switch circuit, each pulse adjusting driver corresponds to one pulse adjusting switch circuit, and each group of the pulse adjusting driver and the pulse adjusting switch circuit is configured to provide one second driving signal having different phase from one another to the processor.

13. The power supply system of claim 12, wherein the second driving signal output from each group of the pulse adjusting driver and the pulse adjusting switch circuit is provided to the processing in time-sharing.

14. The power supply system of claim 13, wherein each pulse adjusting driver receives the PWM signal, adjusts a phase of the PWM signal, and output a low pass driving signal, a high pass driving signal and the adjusted PWM signal to the corresponding pulse adjusting switch circuit, and the corresponding pulse adjusting switch circuit adjusts the first driving signal according to the low pass driving signal, the high pass driving signal and the adjusted PWM signal to generate the second driving signal.

15. The power supply system of claim 14, wherein the phases of the PWM signals adjusted by each pulse adjusting driver are different from one another.

16. The power supply system of claim 15, wherein each pulse adjusting driver comprises a phase adjusting pin grounded via a phase adjusting resistor, the pulse adjusting driver adjusting the phase of the PWM signal by adjusting a resistance of the phase adjusting resistor.

17. The power supply system of claim 15, wherein the corresponding pulse adjusting switch circuit comprises a first and second transistors, and an inductor, the low pass driving signal and the high pass driving signal respectively control the first and second transistors to turn on/off, in the situation that the first transistor is turned off and the second transistor is turned on, the first driving signal is provided to an terminal of the inductor via the second transistor and the adjusted PWM signal is directly provided to the same terminal of the inductor to generate the second driving signal, and the second driving signal is output from the other terminal of the inductor.

18. The power supply system of claim 17, wherein each pulse adjusting driver comprises two detection pins connected to the two terminals of the inductors to detect current flowing through the inductor.

19. The power supply system of claim 18, wherein each pulse adjusting driver further comprises an average current pin and an average current controller, the average current pin of the pulse adjusting driver is connected to those of other pulse adjusting drivers, and the average current controller outputs an average current signal via the average current pin according to the inducting current.

20. The power supply system of claim 19, wherein each pulse adjusting driver further comprises a phase pin to output the adjusted PWM signal to the corresponding pulse adjusting switch circuit and a bootstrap pin, and a capacitor is connected between the bootstrap pin and the phase pin to pull up a voltage of the adjusted PWM signal.

* * * * *